United States Patent [19]

Branstetter

[11] 4,282,711
[45] Aug. 11, 1981

[54] HYDROSTATIC TRANSMISSION CONTROL SYSTEM

[75] Inventor: Ronald L. Branstetter, Dubuque, Iowa

[73] Assignee: Deere & Company, Moline, Ill.

[21] Appl. No.: 61,140

[22] Filed: Jul. 26, 1979

[51] Int. Cl.³ ............................................. F16H 39/46
[52] U.S. Cl. ........................................ 60/395; 60/444; 60/490
[58] Field of Search ................. 60/395, 468, 487, 488, 60/490, 494, DIG. 2, 465, 443, 444, 390; 91/361, 51, 47, 364; 417/218

[56] References Cited

U.S. PATENT DOCUMENTS

| 3,365,886 | 1/1968 | Moon, Jr. ............................... 60/443 |
| 3,529,422 | 9/1970 | Herndon ............................... 60/395 |
| 3,618,469 | 11/1971 | Wills et al. ........................... 91/361 |
| 3,659,672 | 5/1972 | Jacobus ............................... 180/65 R |
| 3,667,225 | 6/1972 | Karman ....................... 60/DIG. 2 X |
| 3,901,031 | 8/1975 | Knapp et al. ....................... 60/395 |
| 3,924,410 | 12/1975 | Cornell et al. ....................... 60/403 |
| 3,954,046 | 5/1976 | Stillhard ............................... 91/361 |
| 3,964,518 | 6/1976 | Hesse et al. ............................... 91/51 |
| 4,091,617 | 5/1978 | Cornell ............................... 60/465 X |
| 4,103,489 | 8/1978 | Fletcher et al. ....................... 60/449 |
| 4,168,612 | 9/1979 | Nikolaus ............................... 60/488 |
| 4,194,361 | 3/1980 | Pahl ....................................... 60/388 |

FOREIGN PATENT DOCUMENTS 1383823 2/1975 United Kingdom .
1508641 4/1978 United Kingdom .

Primary Examiner—Irwin C. Cohen

[57] ABSTRACT

The hydrostatic transmission control system includes a first and second two-position solenoid valve which function to alter the hydraulic fluid parameters as delivered to the servo control cylinders of a variable displacement pump associated with a hydrostatic transmission. Activation of the first solenoid valve instigates a varying of pump displacement. Once the desired pump displacement has been achieved, the second solenoid valve is activated to maintain the desired pump displacement. The deactivation of both solenoid valves results in the hydrostatic transmission seeking and maintaining a neutral mode.

15 Claims, 6 Drawing Figures

HYDROSTATIC TRANSMISSION CONTROL SYSTEM

BACKGROUND OF THE INVENTION

This invention relates generally to a hydrostatic transmission control system and, more specifically, to a hydrostatic transmission control system which is operable to effect a variation in the displacement of the hydrostatic transmission.

It is common practice to utilize mechanical and hydraulic controls to vary the effective displacement of the pump unit of a hydrostatic transmission. In addition, some electrohydraulic controls have been utilized to regulate the displacement of the hydrostatic transmission. Electrohydraulic controls have proven to be more accurate than mechanical or hydraulic controls; however, electrohydraulic controls have a higher cost associated with them. A major contributing factor to the cost of electrohydraulic controls is the number and type of hydraulic valves which are utilized in the conventional electrohydraulic control system. For example, one of the valves within the conventional electrohydraulic controls is a direct control valve or spool valve, which valves are expensive and sensitive to contaminants. In order to enhance the comparative position of electrohydraulic controls to the other known hydrostatic transmission control systems, it is desirable to minimize the number and complexity of valves utilized in the control systems without sacrificing system accuracy.

The present invention discloses a hydraulic control system which employs a reduced number of valves which are less sensitive to contaminants and simpler in design.

SUMMARY OF THE INVENTION

The hydraulic control system is designed to respond to electrical stimulus to effect the displacement of either the pump unit or motor unit associated with a hydrostatic transmission. To instigate a change in the displacement of a unit and thereby the hydrostatic transmission, a first two-position solenoid valve is activated by a control circuit which effects the fluid parameters exhibited at one of the unit servo control cylinders. The effected control cylinder initiates a change in the unit displacement. Upon achieving the desired displacement, a two-position second solenoid valve is activated by the control circuit which functions to maintain the achieved unit displacement. Deactivation of both solenoid valves allows the hydrostatic transmission to seek a neutral mode. Alternatively, both the pump unit and motor unit displacement may be displaced in like manner to increase the overall displacement range of the hydrostatic transmission.

It is an object of the present invention to reveal a hydrostatic transmission control system which is both accurate and relatively inexpensive.

DESCRIPTION OF THE PREFERRED EMBODIMENT

Figure 1:
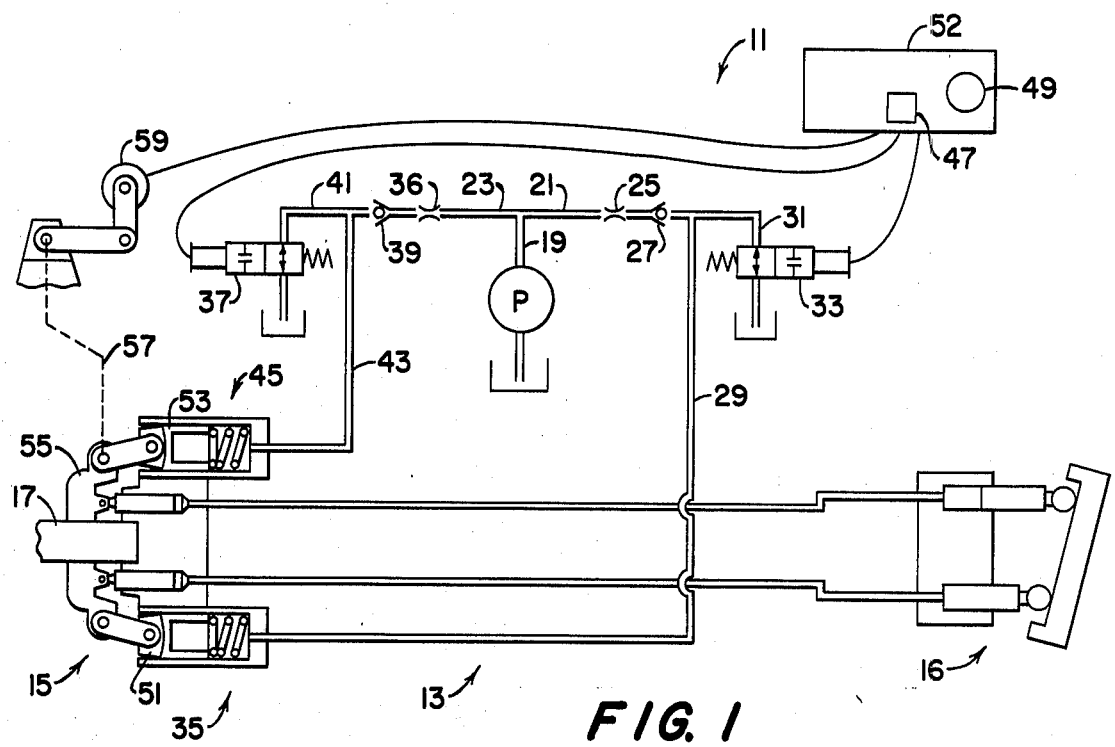
FIG. 1 is a schematic of a hydrostatic transmission in a neutral mode coupled to the control system.

A control system 11 constructed in accordance with the present invention is illustrated in FIG. 1 in association with a hydrostatic transmission 13 having a variable displacement pump unit 15 with an input shaft 17 which is driven at a substantially constant speed by a prime mover (not shown). The hydrostatic transmission 13, as shown in FIG. 1, is in a neutral mode. Pump P delivers pressure influenced fluid to conduit 19 which conducts the fluid to conduits 21 and 23. Conduit 21 conducts the delivered fluid through a flow resistor 25 and check valve 27 to conduits 29 and 31. Conduit 23 conducts the delivered fluid through a second resistor 36 and second check valve 39 to conduits 41 and 43. The presence of the flow resistors 25 and 36 and the check valves 27 and 39 assures the presence of generally identical fluid parameters just downstream of the check valves 27 and 39 in respective conduits 21 and 23.

The fluid in conduit 31 passes through a normally open first two-position solenoid valve 33 and therefrom to sump. Conduit 29 allows fluid communication to the first servo control cylinder 35 of pump unit 15 from conduit 21. The fluid in conduit 41 passes through a normally open second two-position solenoid valve 37 and therefrom to sump. Conduit 43 allows fluid communication to second servo control cylinder 45 from conduit 23. In a neutral mode, both the first and second servo control cylinders 35 and 45 are experiencing minimum fluid influence, because the main fluid influence is being directed to sump by conduits 41 and 31 which perform a fluid bypass function.

Figure 2:
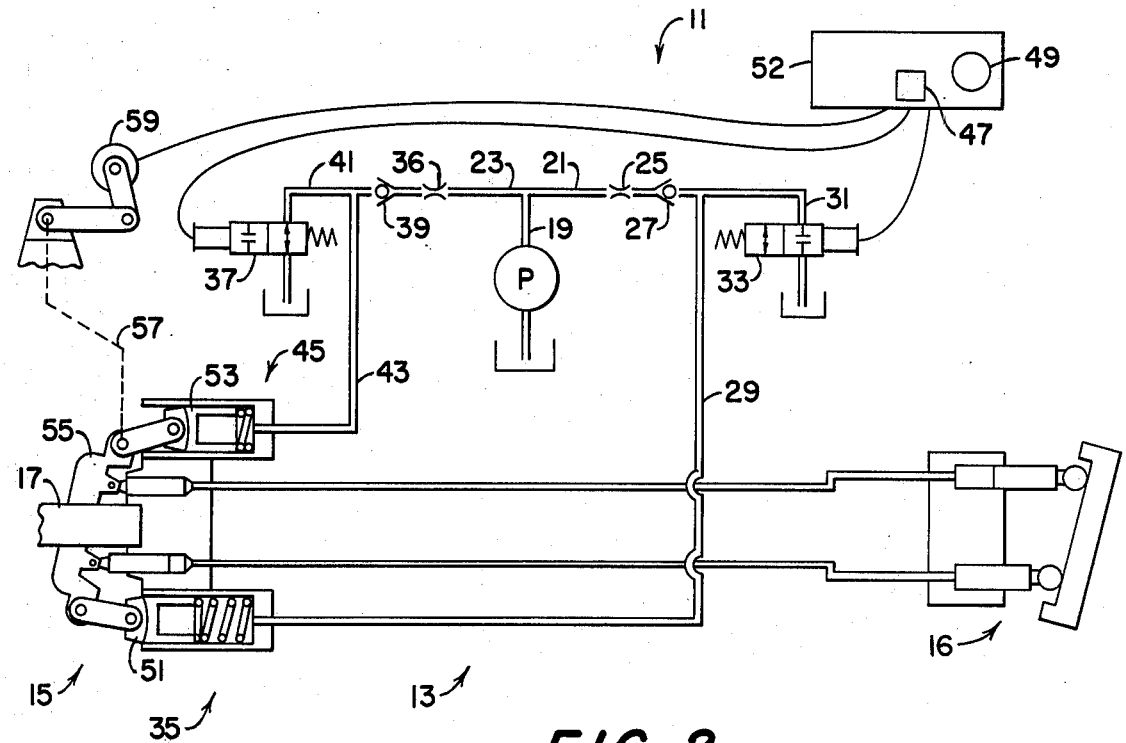
FIG. 2 is a schematic of a hydrostatic transmission coupled to the control system upon initiation of displacement of the hydrostatic transmission.

Referring to FIG. 2, to instigate displacement of the pump unit 15 in the preferred embodiment, a three-position switch 47 of the control circuit 11 is set to the desired displacement direction, i.e., forward or reverse. A potentiometer 49 is rotated to indicate the magnitude of pump displacement desired, in response thereto, an electrical control circuit, generally indicated as 52, provides sufficient electrical potential to activate either the first solenoid valve 33 to obtain forward displacement or second solenoid valve 37 to obtain reverse displacements of said pump unit 15. In the forward displacement mode, activation of the first solenoid valve 33 by the control circuit 52 causes the first solenoid valve 33 to assume a closed position and obstruct the fluid path through conduit 31 to sump. As a result thereof, the fluid parameters as delivered from conduit 21 are fluidly transmitted through conduit 29 to the first servo control cylinder 35, causing the first servo control cylinder to extend piston 51. The motion of piston 51 is translated to a corresponding retraction of piston 53 in the second servo control cylinder via the swashplate 55 associated with the pump unit 15. Because the second solenoid valve 37 remains unactivated, a back flow of fluid generated by the retraction of piston 53 of the second servo control cylinder 45 is not inhibited. As a result of the described fluid action on the first and second servo control cylinders 35 and 45, displacement of the pump unit 15 is achieved.

Figure 3:
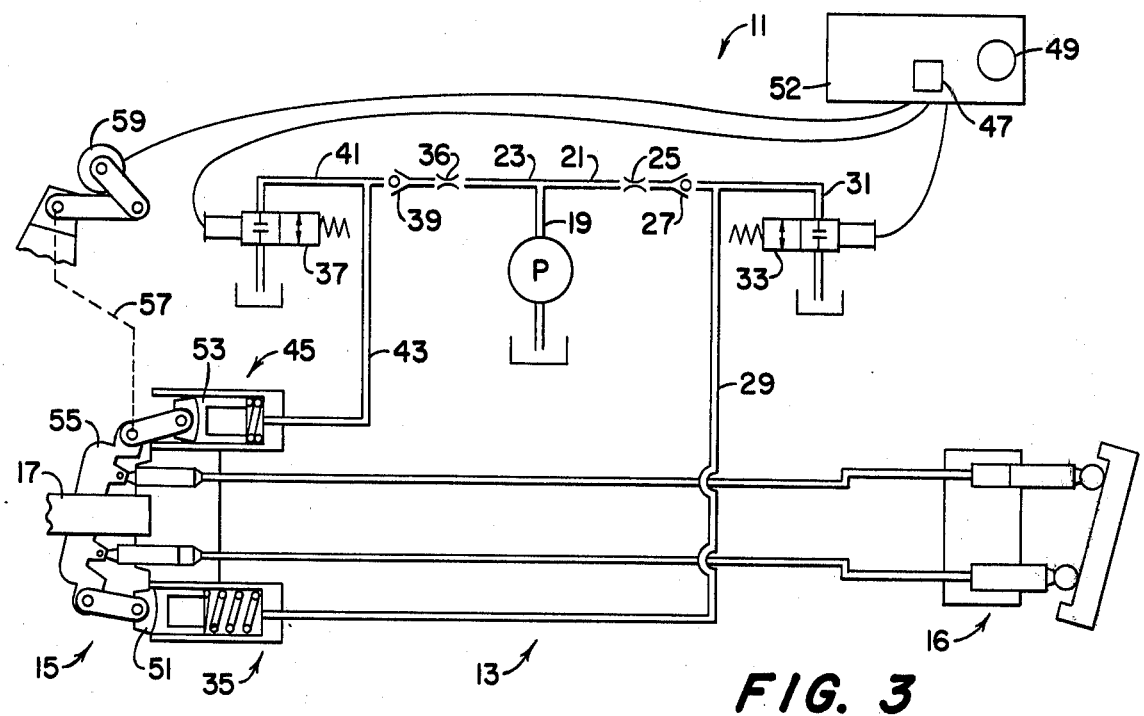
FIG. 3 is a schematic of a hydrostatic transmission coupled to the control system upon attaining full desired displacement.

The swashplate 55 associated with the pump unit 15 is in responsive communication to a feedback potentiometer 59 by any conventional means, indicated in the figures by a dashed line 57. Feedback potentiometer 59 is in electrical communication with the control circuit 52, such that, pump unit 15 displacement is responsible for potentiometer 59 generating a representative electrical potential delivered to control circuit 52. Once the desired pump unit 15 displacement has been generally achieved, the second solenoid control valve 37 is activated by the control circuit 52 to assume a closed position obstructing the flow path through conduit 41 to sump. Thereafter the fluid parameters fluidly communicated to the second servo control cylinder 45 are the same as communicated to the first servo control cylinder 35 causing the displaced pump unit 15 to assume a steady state condition, i.e., pump unit 15 will experience no further displacement (refer to FIG. 3).

Reverse displacement of the pump unit 15 is obtained in like manner to forward displacement of the pump unit 15; except, the position switch 47 is placed to indicate a reverse mode and the first and second solenoid valves 33 and 37, respectively, are activated by the control circuit 52 in reverse order. Placing the position switch in a neutral indicated mode results in both the first and second solenoid valves being in an open position, thereby, allowing the pump unit 15 resilience to return the pump unit 15 to a neutral mode.

The aforementioned hydrostatic transmission control system has been described in reference to a hydrostatic transmission having a fixed displacement motor 16, however, it is readily apparent that the aforedescribed is equally suitable to vary the displacement of a variable displacement motor of an accommodating hydrostatic transmission.

ELECTRICAL CONTROL CIRCUITRY

Figure 4:
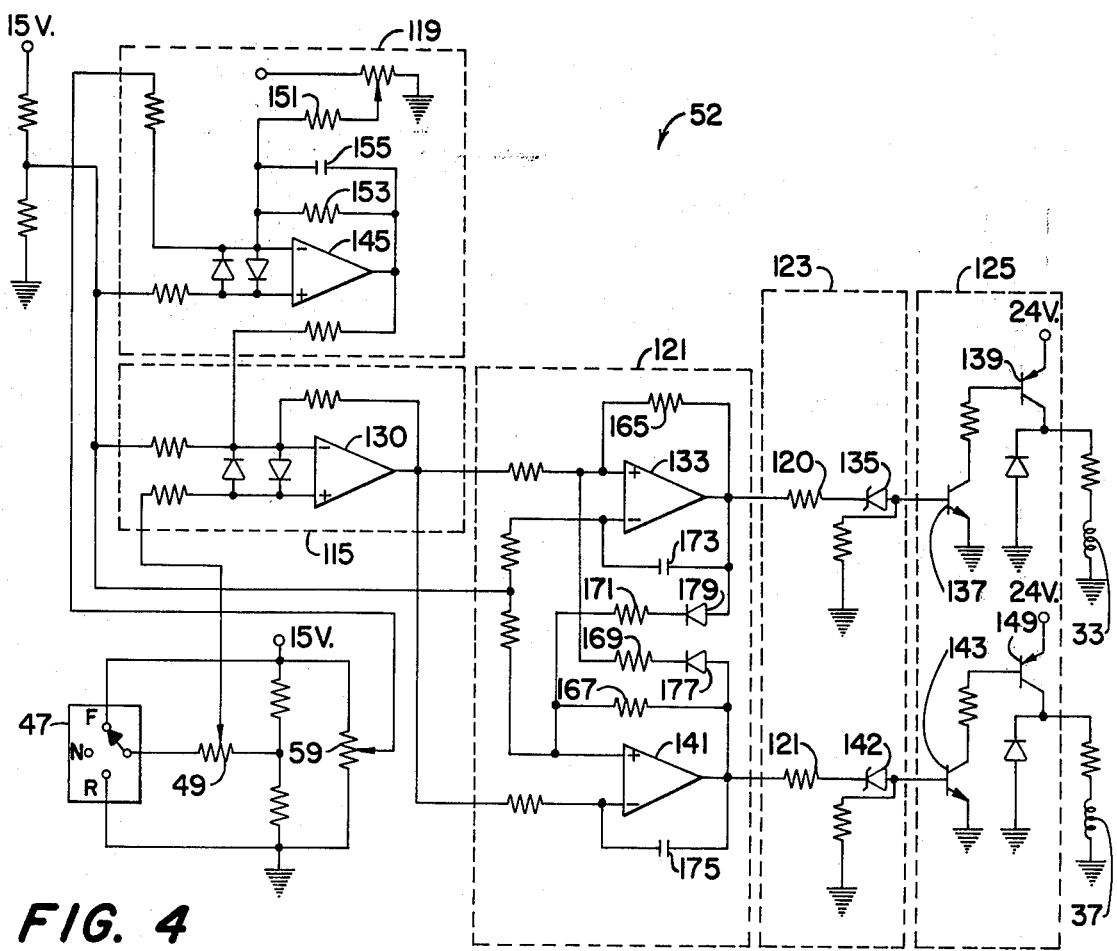
FIG. 4 is a schematic of an electrical circuit for use in the control system.

Referring to FIG. 4, the electrical control circuit 52 includes a command signal generator or potentiometer 49, a difference amplifier circuit 115, and a feedback filter circuit 119 which could incorporate a circuit to compensate for non-linearities in the mechanical linkage which connects the feedback potentiometer 59 to the pump swash plate 55. The command signal generator 49 transmits an electrical signal potential to the difference amplifier circuit 115. The position feedback potentiometer 59 transmits a signal potential through the feedback filter circuit 119 and, therefrom, to the differing amplifier circuit 115 where the difference between electrical potential generated by the command potentiometer 49 and feedback potentiometer 59 is responsible for an output potential from the difference amplifier circuit 115. The output potential from the difference amplifier 115 is transmitted to a reference crossing comparator circuit 121. In response to received potential, the comparator circuit 121 transmits a potential to a noise blocking circuit 123 wherefrom the potential is transmitted to the power output amplifier circuit 125 which activates the solenoids 33 and 37 as required.

To effect forward displacement of the pump unit 15, the three-position switch 47 (positions being forward F, reverse R, or neutral N) is placed in the forward position F. The command potentiometer 49 is then set to indicate the desired pump unit 15 displacement, transmitting an output potential proportional to the desired displacement. The output from the command potentiometer 49 is delivered to the non-inverting input of a difference amplifier 130 associated with the difference amplifier circuit 115. In response to the potential generated by the command potentiometer 49 the output of difference amplifier 130 is increased. The increased output of the difference amplifier 130 is delivered to voltage comparator 133 and voltage comparator 141 associated with the reference crossing comparator circuit 121.

The output potential of the difference amplifier 130 is directed to the non-inverting input of voltage comparator 133 and compared to a reference potential delivered to the inverting input terminal of voltage comparator 133, increasing the output potential of voltage comparator 133. The output potential of voltage comparator 133 is delivered to zener diode 135 causing the zener diode 135 to conduct current. As a result of zener diode 135 conducting, transistor 137 becomes saturated pulling the base of transistor 139 to a low state resulting in transistor 139 activating first solenoid valve 33.

The increased output potential of difference amplifier 130 is also transmitted to the inverting input of voltage comparator 141 associated with the reference crossing comparator circuit 121 decreasing the output potential of voltage comparator 141. As a result of the decreased output potential of voltage comparator 141 the transistor 143 is reverse biased placing the transistor 143 in an "off" state. With transistor 143 in an "off" state the base of transistor 149 goes high resulting in no current being delivered to solenoid valve 37.

As the displacement of the pump unit 15 approaches the desired displacement the potential generated by the feedback potentiometer 59 decreases with respect to the reference input potential transmitted to the non-inverting input of difference amplifier 145, thereby causing the output of the difference amplifier 145 to increase. The output of difference amplifier 145 is transmitted to the inverting input of difference amplifier 130 causing the output potential of difference amplifier 130 to decrease. The decreased output potential of difference amplifier 130 is, in addition to being transmitted to voltage comparator 133, transmitted to the inverting input of voltage comparator 141. The input potential to voltage comparator 141 as compared to the reference potential which is placed on a non-inverting input of voltage comparator 141, results in an increased output potential from voltage comparator 141. The increased output potential of voltage comparator 141 is transmitted to a zener diode 142 causing the zener diode 142 to conduct. As a result of conduction by the zener diode 142, transistor 143 is saturated causing the transistor to assume an "on" state. When transistor 143 is in an "on" state the base of transistor 149 is pulled low allowing current to be conducted to solenoid valve 37. As a result of the above action both solenoid valves 33 and 37 are now in an "on" state causing the pump unit 15 displacement to stabilize at the achieved displacement.

To obtain a reverse mode, the position switch 47 is placed in reverse position R. The command potentiometer 49 is then set to indicate the desired displacement causing a signal to be delivered to the non-inverting terminal of difference amplifier 130. The command potential is of a lower state in the reverse mode as compared to the forward mode thereby causing the output potential of difference amplifier 130 to decrease. The decreased output potential of difference amplifier 130 thereby causes the output potential of voltage comparator 133 to decrease, forward biasing zener diode 135 to allow transistor 137 to be reverse biased placing it in an "off" mode. The result of transistor 137 being in an "off" mode causes the base of transistor 139 to assume a high state resulting in no current being delivered to the solenoid valve 33.

The output potential of difference amplifier 130 is transmitted to the inverting input of voltage comparator 141 resulting in voltage comparator 141 obtaining an increased output potential which results in zener diode 142 conducting such that transistor 143 is placed in an "on" state which pulls down the base of transistor 149 allowing transistor 149 to conduct current to solenoid valve 37, resulting in actuation of solenoid valve 37.

As the displacement of the pump unit 15 approaches the set displacement the output potential from the feedback potentiometer 59 increases causing the output potential of difference amplifier 145 to decrease. In turn this causes the output potential of difference amplifier 130 to increase thereby increasing the output of amplifier 133 until the zener diode 135 is placed in a conducting mode, such that transistor 137 is placed in an "on" state, i.e., forward biased, which in turn places the base of transistor 139 in a low state allowing transistor 139 to activate solenoid valve 33. As a result both solenoids 33 and 37 are now "on" or activated, and the displacement of the pump unit 15 in the reverse mode is maintained or stabilized.

The feedback filter circuit 119 which is a recipient of the feedback potential is comprised of resistors 151 and 153 and capacitor 155 in conjunction with difference amplifier 145 in a conventional arrangement. The feedback filter is a low pass frequency filter, and as a result does not affect the signal of the feedback potentiometer 59 which is a low frequency signal. Therefore, the filter only affects high frequency noise within the circuit 52 between the control circuit 52 and the feedback potentiometer 59.

The purpose of the reference crossing comparator 121 is to cause one solenoid 33 or 37 to be activated to increase or decrease pump unit 15 displacement and to activate both solenoids 33 and 37 when the actual pump unit 15 displacement is substantially the same as the desired displacement. To derive this action, comparator 121 has symmetrical single stage hysteresis and asymmetrical interstage hysteresis. Symmetrical single stage hysteresis is commonly seen on voltage comparators. This simple hysteresis is implemented by resistors 165 and 167, and voltage comparators 133 and 141. The result of having symmetrical hysteresis on a comparator is that the noninverting input of the comparator must go slightly higher than the inverting input before the output switches "high". Likewise, the noninverting input must go slightly lower than the inverting input before the input is switched "low".

The asymmetrical interstage hysteresis functions through resistors 171 and 169, diodes 179 and 177, and voltage comparators 133 and 141. It is this feature which locks both solenoids "on" when the desired pump unit 15 displacement is reached. If comparator 133 is "on" and comparator 141 is "off", some current from the output of comparator 133, which is high, is fed through diode 179 and resistor 171 to the noninverting input of comparator 141 which is low. The added current at the input of comparator 141 influences the comparator to turn "on" more easily and once "on", to stay "on" more firmly. Similar events occur if comparator 141 is "on" and comparator 133 is "off".

If comparator 133 is "on" and comparator 141 is "off", the potential exists to pull the noninverting input of comparator 133 low through resistor 169 and switch the output of comparator 133 low. However, diode 177 blocks this reverse current flow and comparator 133 is not influenced to turn off. Hence, this cross stage hysteresis influences the comparators to turn "on" more easily but not to turn "off" more easily, giving rise to the term "Asymmetrical Interstage Hysteresis".

It is further noted that the presence of the noise blocking circuit comprised of resistor 120, zener diode 135, resistor 121, and zener diode 142 in the circuit inhibit low amplitude noise from activating the solenoid.

ALTERNATE EMBODIMENT

Figure 5:
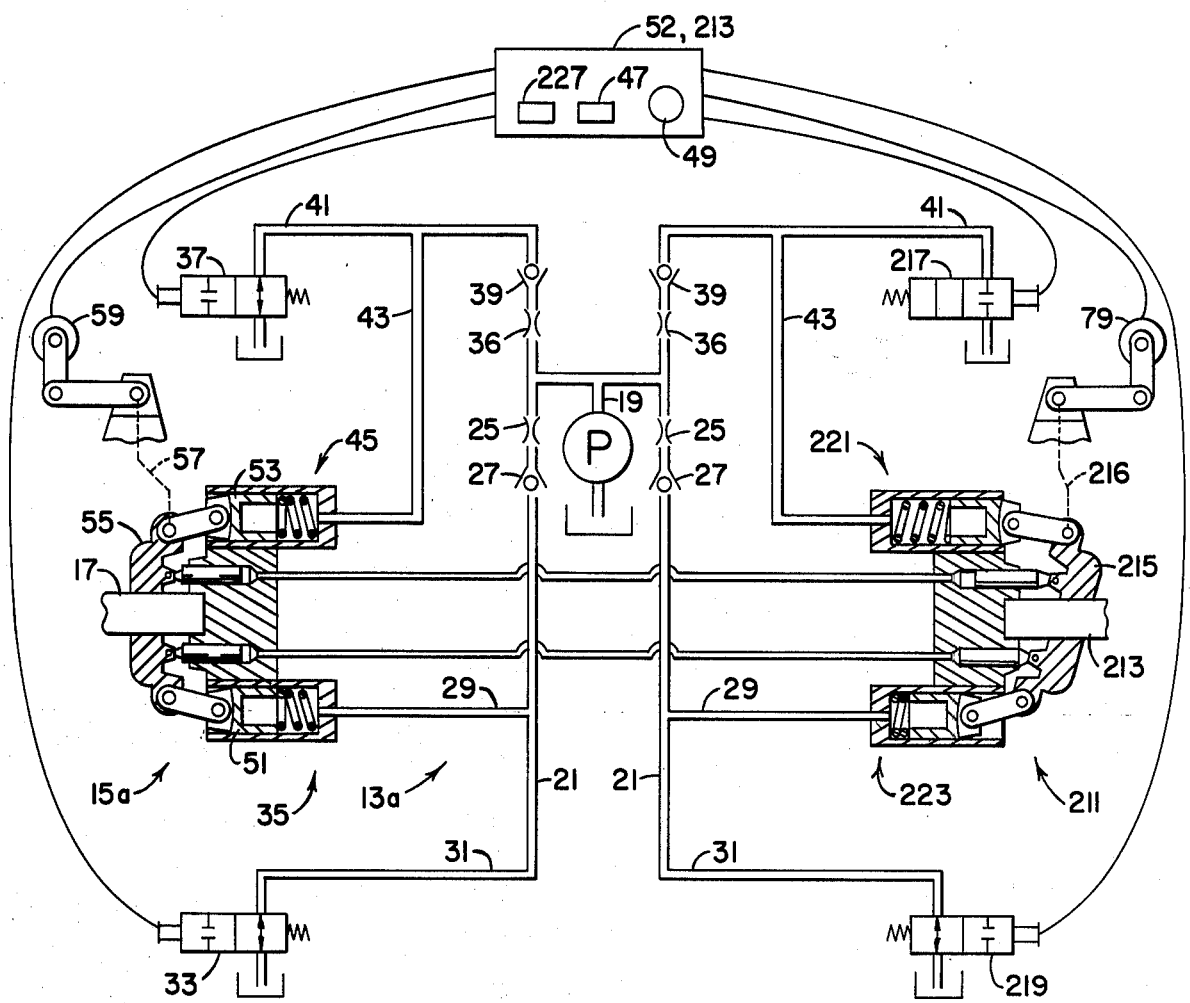
FIG. 5 is a schematic of a hydrostatic transmission having both a variable displacement pump unit and motor unit coupled to an alternative control system.

Some hydrostatic transmissions utilize a variable displacement pump and motor unit. Referring to FIG. 5, a hydrostatic transmission, generally indicated as 13a, includes a variable displacement pump 15a and a variable displacement motor 211. The variable displacement pump 15a is identical to the aforedescribed pump 15 being comprised of the identical constituent parts and controlled in the aforedescribed manner. The motor unit 211 is comprised of the same constituent parts and controlled in the same manner as pump unit 15a. Generally, when the input shaft 17 of pump unit 15a is rotated at a constant speed, the output shaft 213 of motor unit 211 increases speed as the displacement of pump unit 15a increases. When the pump unit 15a achieves maximum displacement in either the forward or reverse mode, the speed of the output shaft 213 can be further increased by decreasing the displacement of the motor unit 211, i.e., decreasing the displacement of swash plate 215.

The displacement of motor unit 211 is controlled by the operation of first and second two-position solenoid valves 217 and 219. The solenoid valves 217 and 219 effect the hydraulic fluid parameters which influence servo control cylinders 221 and 223, respectively, to vary the displacement of motor unit 211 in the same manner as the aforedescribed servo control cylinders 35 and 45 are effected by solenoid valves 33 and 37 to effect a variation in the displacement of pump 15. The action of the hydraulics involved in controlling the displacement of the motor unit 211 is the same as that involved in controlling the displacement of the pump unit 15, with the exception that in the neutral mode solenoid valve 217 is activated to maintain a maximum initial displacement of swash plate 215. The electronics needed to control the displacement of motor unit 211 is similar to the electronics needed to control the displacement of pump unit 15a with the addition of a motor swash plate control enabling circuit 225 and a switch 227 to interchange the reference and command on the reference crossing comparator stage 229 when the direction of the transmission 13a is changed.

Figure 6:
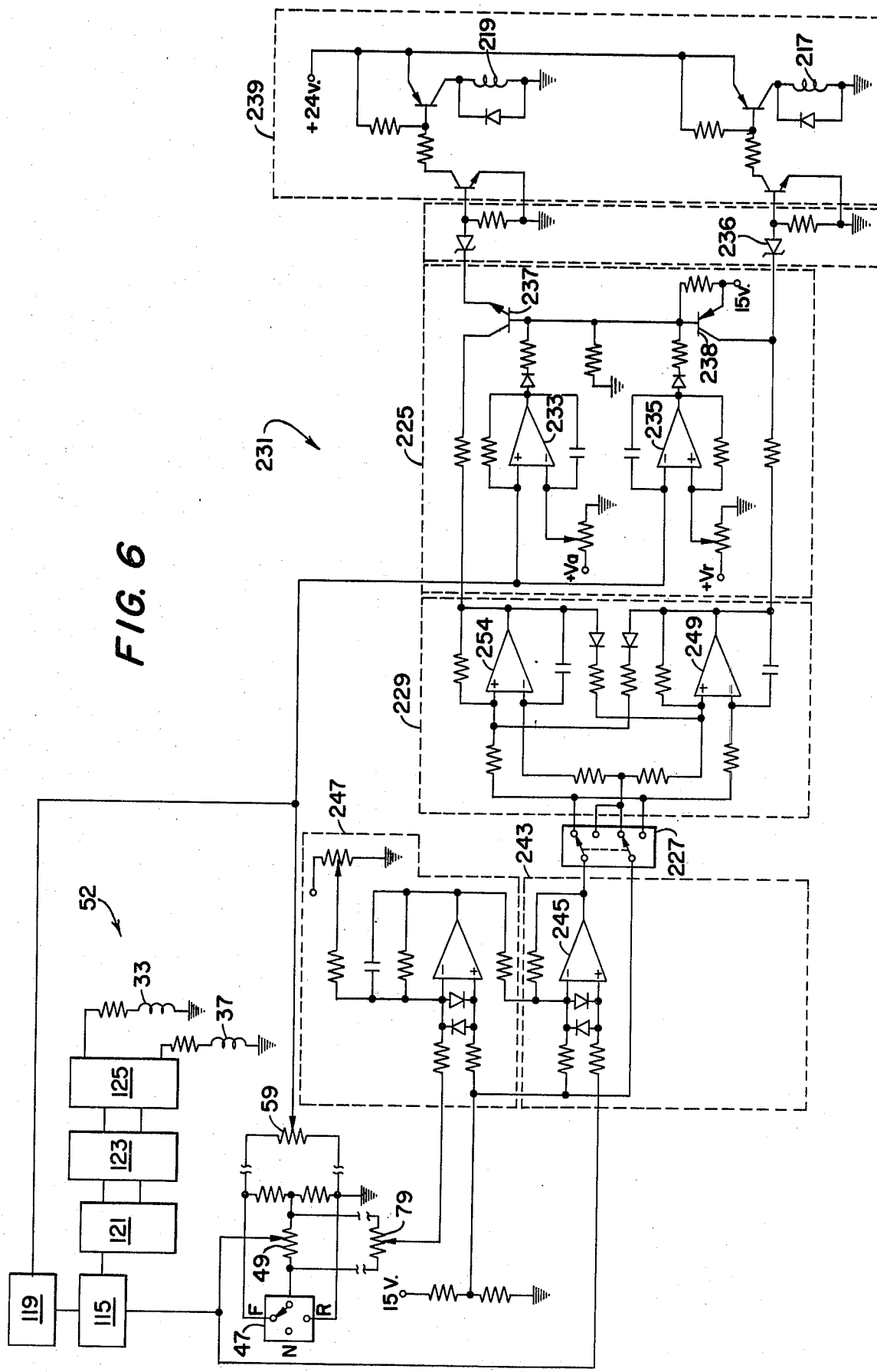
FIG. 6 is a schematic of an electrical control for use in the alternative control system.

Referring to FIG. 6, to derive the desired transmission operation, a circuit 231 is coupled to the aforedescribed circuit 52. In operation, pump feedback potentiometer 59 will output a relatively low electrical potential when the pump unit 15a is at maximum forward displacement and a relatively high electrical potential when the pump unit 15a is at maximum reverse displacement. The output potential from potentiometer 59 is directed to the non-inverting input of voltage comparator 233 and the inverting input of voltage comparator 235 of the motor control enabling circuit 225. The inverting input of voltage comparator 233 is connected to a reference voltage Va which is adjusted to be equal to or be slightly less than the output of potentiometer 59 when the pump unit 15a is at maximum reverse displacement. Voltage comparator 235 has a reference voltage Vr communicating with the non-inverting input which is adjusted to equal or be slightly greater than the output of potentiometer 59 when the pump unit 15a is at maximum forward displacement. It is observed that should the pump unit 15a displacement be less than maximum in either the forward or reverse direction the output of both voltage comparators 233 and 235 will go low thereby biasing transistor 238 to conduct a potential resulting in zenner diode 236 being biased to allow activation of the power amplifer circuit 239 such that first solenoid valve 217 is activated to maintain the initial displacement of motor unit 211. It is noted that in this condition transistor 237 is reverse biased to be in the "off" state thereby not allowing solenoid valve 219 to be activated.

The combined control circuits 52 and 231 operate in the following manner. Assuming that the speed control potentiometer 49 is set sufficiently high that the desired speed cannot be reached by rotating the swash plate 55 of pump unit 15a to maximum forward displacement, circuit 52 functioning as aforedescribed, the output from potentiometer 59 will be sufficiently low to cause the output of voltage comparator 235 to go high, thereby reverse biasing transistor 238 resulting in solenoid 217 becoming deactivated. The output of voltage comparator 249 is insufficient to reactivate solenoid valve 217. In addition, transistor 237 is forward biased and since the output of potentiometer 79 is relatively high (maximum displacement) circuits 243 and 229, which are identical and function in like manner as the aforedescribed circuits 115 and 121, will transmit sufficient potential to the power output circuit 239 to activate solenoid valve 219. The output of potentiometer 79 is sufficiently high to cause the output of comparator 249 to go "low", deactivating solenoid 217, causing swash plate 215 to rotate in the direction which will decrease the displacement of motor unit 211. When the motor unit 211 has approximated the desired displacement, the output of potentiometer 79 will be sufficiently low to cause comparator 249 of circuit 229 to go high in an aforedescribed manner to reactivate solenoid 217 to maintain the achieved displacement. Circuits 247, 243, 229, and 239 function the same as respective circuits 119, 115, 121 and 125 as aforedescribed relative to the input potentials.

If the directional control switches 47 and 227 are moved from forward to reverse mode the output of the speed control potentiometer 49 will be low causing the output of the difference amplifier 245 of circuit 243 to go low. The output of difference amplifier 245 is now connected to the non-inverting input of voltage comparator 249 and the inverting input of voltage comparator 254. As the swash plate 55 of pump unit 15a reaches maximum reverse displacement, the output of potentiometer 59 is sufficiently high to cause comparator 233 to go high. The resulting biasing of transistors 237 and 238 put circuit 229 in communication with circuit 239. The low output from amplifier 245 causes the output of voltage comparator 254 to go high and the output of comparator 249 to go low causing solenoid 219 to be turned "on" and solenoid 217 turned "off" causing the motor unit 211 to decrease in displacement. Since the polarity of the potential on the motor feedback potentiometer 79 has been reversed, the decreasing motor displacement causes the output potential of the feedback potentiometer 79 to increase. Motor swash plate 215 will continue to rotate until the potential output of potentiometer 79 is sufficiently high to cause solenoid 217 to be turned back on locking the swash plate 215 in place.

I claim:

1. In combination a hydrostatic transmission having a fluid responsive variable displacement pump unit in fluid communication with a motor, a pair of pressure responsive servo means for varying the displacement of said pump unit, a source of displacing fluid open to said pair of pressure responsive servo means, a reservoir, a first and second electrically responsive normally open valve means connecting said source and said pair of pressure responsive servo means to said reservoir, and an electric control circuit for controlling said first and second electrically responsive valve means, wherein the electrical control circuit comprising:
    (a) first means for generating a first electrical signal potential proportional to desired displacement of said unit;
    (b) second means for generating a second electrical signal potential proportional to actual displacement of said unit;
    (c) means responsive to said first and second electrical signal potentials for providing a first electrical output signal potential which is indicative of whether the displacement of said unit is less than or greater than the selected displacement;
    (d) power output amplifier means for activating said first and second valve means; and,
    (e) comparator means for receiving said first output potential and comparing said first output potential to a predetermined amount, should said first output potential indicate said unit displacement is less than said desired displacement and said first output potential is greater than said predetermined amount, said comparator means generates a second output potential sufficient to cause said power output amplfier means to activate said first valve means to initiate displacement in one direction of said unit, should said first output potential indicate said unit displacement is greater than said desired displacement and said first output potential less than said predetermined amount said comparator means generates a third output potential sufficient to cause said power output amplifier means to activate said second valve means to initiate displacement in another direction of said unit, should said first output potential be within a predetermined range of said predetermined amount said comparator means generates a second and third output potential sufficient to cause said power output amplifier means to activate said first and second valve means to maintain achieved displacement.

2. An electrical control circuit as claimed in claim 1, further comprises means for maintaining said second and third output potentials at a sufficiently high level to assure the continuous activation of said first and second valve means once both of said valve means have been activated until said first means or said second means is changed.

3. An electrical control circuit as claimed in claim 1, further comprising filtering means for filtering high frequency noise from said second electrical signal potential.

4. An electrical control circuit as claimed in claim 3, further comprising noise blocking means for blocking low amplitude circuit noise from causing said power output amplifier means to activate said first and second solenoid valves.

5. An electrical control circuit as claimed in claim 1, wherein said comparator means, comprises:
   (a) a first voltage comparator to receive said first electrical output signal at the non-inverting input of said first comparator, said output from said first comparator being said second output potential;
   (b) A second voltage comparator to receive said first electrical output signal at the inverting input of said second comparator, said output from said second comparator being said third output potential; and,
   (c) a reference potential delivered to said inverting input of said first comparator and to said non-inverting input of said second comparator, whereby, should said first electrical output potential be sufficiently high as compared to said reference potential said second output potential will be sufficiently high to cause said power output amplifier means to activate said first valve means, should said first electrical output potential be sufficiently low as compared to said reference potential said third output potential will be sufficiently high to cause said power output amplifier means to activate said second valve means, should said first electrical output potential approximate said reference potential said second and third output potentials will be sufficiently high to cause said power output amplifier means to activate said first and second valve means.

6. An electrical control circuit as claimed in claim 5 further comprising;
   (a) a first diode in communication with said output from said first comparator and said non-inverting input of said second comparator such that current can only flow in the direction from said output of said first comparator to said non-inverting input of said second comparator;
   (b) a second diode in communication with said output from said second comparator and said non-inverting input of said first comparator such that current can only flow in one direction from said output of said second comparator to said non-inverting input of said first comparator, whereby, when said first and second valve means are activated said first electrical potential is sufficiently increased to said first voltage comparator and said reference voltage is sufficiently increased to said second voltage comparator to assure continued activation of said first and second valve means.

7. In combination a hydrostatic transmission having a fluid responsive variable displacement pump being a first unit and motor being a second unit, a pair of pressure responsive servo means respectively associated with each of said first and second units for varying the displacement thereof, a source of displacing fluid open to said pairs of pressure responsive servo means, a reservoir, a plurality of electrically responsive normally open valve means for each of said first and second units connecting said source and said pairs of pressure responsive servo means to said reservoir and an electrical control circuit for controlling said plurality of electrically responsive valve means, wherein the electrical control circuit comprises:
   (a) first means for generating a first electrical signal potential proportional to the desired displacement of said first and second units;
   (b) second means for generating a second electrical signal potential proportional to the actual displacement of said first unit;
   (c) third means for generating a third electrical signal potential proportional to the actual displacement of said second unit;
   (d) fourth means responsive to said first and second electrical signal potential to generate a first output potential to at least one of said valve means to effect a change in the displacement of said first unit;
   (e) fifth means responsive to said first, second and third means to generate a second output potential to another of at least one of said valve means to effect a change in displacement of said second unit when said first unit has been fully displaced.

8. An electrical circuit as claimed in claim 7 wherein said fifth means comprises:
   (a) means responsive to said first and third electrical signal potentials for providing a third electrical output signal potential which indicates whether the displacement of said second unit is greater than the desired displacement;
   (b) power output amplifier means for activating a first and second valve means;
   (c) comparator means for receiving said third electrical output potential and comparing said third output potential to a predetermined amount, should said third output potential indicate said second unit displacement is greater than said desired displacement and said third output potential is greater than said predetermined amount, said comparator means to generate a fourth output potential sufficient to activate said first valve means to initiate displacement of said second unit, should said third output potential approximate said predetermined desired amount, said comparator means to generate a fourth and fifth output potential sufficient to cause said power output amplifier means to activate said first and second valve means to maintain said achieved displacement;
   (d) enabling means responsive to said second electrical signal potential to maintain said valve means in a mode such that said second unit maintains an initially displaced position until said first unit is fully displaced whereafter said enabling means allows said comparator means to communicate with said power output means such that said second unit displacement is changed.

9. An electrical control circuit as claimed in claim 8, wherein said enabling means, comprises:
   (a) first voltage comparator, said first comparator to receive said second electrical signal potential at the non-inverting input of said first comparator;
   (b) a first reference voltage delivered to said inverting input of said first voltage comparator, said first reference voltage to be slightly less than said second electrical signal potential when said first unit is fully displaced in the reverse direction;
   (c) a second voltage comparator, said second comparator to receive said second electrical signal potential at the inverting input of said second comparator;
   (d) a second reference voltage delivered to said non-inverting input of said second comparator, said second reference voltage to be slightly greater than said second electrical signal potential when said first unit is fully displaced in the forward direction;

(e) gate means electrically responsive to the output of said first and second voltage comparator to allow said comparator means to communicate with said power output amplifier means when said first unit has been fully displaced.

10. An electrical control circuit as claimed in claim 9, wherein said gate means is a transistor.

11. In combination a hydrostatic transmission having a fluid responsive variable displacement pump being a first unit and motor being a second unit, a pair of pressure responsive servo means, respectively associated with each of said first and second units for varying the displacement thereof, a source of displacing fluid open to said pairs of pressure responsive servo means, a reservoir, a plurality of electrically responsive normally open valve means for each of said first and second units connecting said source and said pairs of pressure responsive servo means to said reservoir, and an electrical control circuit for controlling said plurality of electrically responsive valve means, wherein the control circuit comprises:

(a) first means for generating a first electrical signal potential proportional to desired combined displacement of said first and second units;

(b) second means for generating a second electrical signal potential proportional to the actual displacement of said first unit;

(c) third means for generating a third electrical signal potential proportional to the actual displacement of said second unit;

(d) first responsive means responsive to said first and second electrical signal potential for providing a first electrical output signal potential which is indicative of whether the displacement of said first unit is less than or greater than the selected displacement;

(e) first power output amplifier means for activating said first and second valve means responsible for displacing said first unit;

(f) second power output amplifier means for activating said third and fourth valve means responsible for displacing said second unit;

(g) first comparator means for receiving said first output potential and comparing said first output potential to a predetermined amount, should said first output potential indicate said first unit displacement is less than tial indicate said first unit displacement is less than said desired displacement and said first output potential is greater than said predetermined amount, said first comparator means generates a second output potential sufficient to cause said first power output amplifier to activate said first valve means to cause said first unit to displace in one direction, should said first output potential indicate said unit displacement is greater than said desired displacement and said first output potential less than said predetermined amount said comparator means generates a third output potential sufficient to cause said power output amplifier to activate said second valve means to cause such first unit to displace in an opposite direction, should said first output potential be within a predetermined range of said predetermined amount said comparator means generates a second and third output potential sufficient to cause said first power output amplifier means to activate said first and second valve means to maintain achieved displacement of said first unit;

(h) second responsive means responsive to said first and third electrical signal potential for providing a fifth electrical output signal potential which indicates whether the displacement of said second unit is greater than the desired displacement;

(i) second comparator means for receiving said fifth electrical output signal potential and comparing said fifth output signal, to a predetermined mount, should said fifth output potential indicate said second unit displacement is less than said predetermined amount and said fifth output potential is greater than said predetermined amount, said fifth comparator means generates a sixth output potential sufficient to cause said second power output amplifier to activate said third valve means to cause said second unit to displace, should said fifth electrical output potential be within a predetermined range of said predetermined amount said comparator means generates a third and fourth output potential sufficient to cause said second power output amplifier means to activate said third and fourth valve means to maintain achieved displacement of said second unit;

(j) enabling means responsive to said second electrical signal potential to maintain said valve means associated with said second unit in a mode such that said second unit maintain an initial position until said first unit is fully displaced whereafter said enabling means allows said second comparator means to communicate with said second power output means such that said second unit displacement is changed.

12. An electrical control circuit as claimed in claim 11, wherein said enabling means, comprises:

(a) first voltage comparator, said first comparator to receive said second electrical signal potential at the non-inverting input of said first comparator;

(b) a first reference voltage delivered to said inverting input of said first voltage comparator;

(c) a second voltage comparator, said second comparator to receive said second electrical signal potential at the inverting input of said comparator;

(d) a second reference voltage delivered to said non-inverting input of said second comparator;

(e) gate means electrically responsive to the output of said first and second voltage comparator to allow said comparator means to communicate with said power output amplifier means when said output from said first and second comparators is sufficient only when said first unit has been fully displaced.

13. An electrical control circuit as claimed in claim 12, wherein said gate means is a transistor.

14. An electrical control circuit as claimed in claim 11, wherein each of said comparator means, comprises:

(a) a third voltage comparator to receive said first electrical output signal at the non-inverting input of said first comparator, said output from said third comparator being said second output potential;

(b) a fourth voltage comparator to receive said first electrical output signal at the inverting input of said fourth comparator, said output from said second comparator being said third output potential;

(c) a reference potential delivered to said inverting input of said third comparator and to said non-inverting input of said fourth comparator, whereby, should said first electrical output potential be sufficiently high as compared to said reference potential said second output potential will be sufficiently high to cause said power output amplifier to activate said valve means, should said first electrical output potential be sufficiently low as compared to said reference potential said third output potential will be sufficiently high to cause said power output amplifier to activate said valve means.

15. An electrical control circuit as claimed in claim 14 further comprising;
(a) a first diode in communication with said output from said third comparator and said non-inverting input of said fourth comparator such that current can only flow in one direction from said output of said third comparator to said input of said fourth comparator.
(b) a second diode in communication with said output from said fourth comparator and said non-inverting input of said third comparator such that current can only flow in one direction from said output of said fourth comparator to said input of said third comparator, whereby, when both of said valve means are activated said electrical potentials at said non-inverting inputs are sufficiently increased to said third voltage comparators to assure continued activation of said first and second valve means.

* * * * *

UNITED STATES PATENT AND TRADEMARK OFFICE
CERTIFICATE OF CORRECTION

PATENT NO. : 4,282,711

DATED : 11 August 1981

INVENTOR(S) : Ronald L. Branstetter

It is certified that error appears in the above—identified patent and that said Letters Patent is hereby corrected as shown below:

Column 9, line 23, delete "sufficinently" and insert -- sufficiently --.

Column 11, lines 49 and 50, delete "tial indicate said first unit displacement is less than".

Column 12, line 10, delete "mount" and insert -- amount --.

Signed and Sealed this

Sixth Day of April 1982

[SEAL]

*Attest:*

GERALD J. MOSSINGHOFF

*Attesting Officer*     *Commissioner of Patents and Trademarks*